US006688475B2

United States Patent
Petrancosta

(10) Patent No.: US 6,688,475 B2
(45) Date of Patent: Feb. 10, 2004

(54) SYSTEM FOR FACILITATING COMPLIANCE WITH MATERIALS HANDLING RULES

(75) Inventor: Robert Gregory Petrancosta, Ann Arbor, MI (US)

(73) Assignee: Con-Way Transportation Services, Inc., Ann Arbor, MI (US)

( * ) Notice: Subject to any disclaimer, the term of this patent is extended or adjusted under 35 U.S.C. 154(b) by 40 days.

(21) Appl. No.: 09/766,109

(22) Filed: Jan. 18, 2001

(65) Prior Publication Data
US 2002/0103570 A1 Aug. 1, 2002

(51) Int. Cl.[7] .............................. B07C 5/00; G06F 19/00
(52) U.S. Cl. ........................................ 209/546; 700/115
(58) Field of Search ................................ 700/115, 281; 702/9, 24, 55, 100; 209/3, 546

(56) References Cited

U.S. PATENT DOCUMENTS

| | | | | |
|---|---|---|---|---|
| 4,716,536 A | * | 12/1987 | Blanchard | 702/100 |
| 4,827,395 A | * | 5/1989 | Anders et al. | 700/9 |
| 5,822,716 A | * | 10/1998 | Morell et al. | 702/55 |

* cited by examiner

Primary Examiner—Tuan N. Nguyen
(74) Attorney, Agent, or Firm—Raphael A. Monsanto; Benita J. Rohm

(57) ABSTRACT

System and apparatus for determining a relationship between transportable or storable materials and plural transportation or storage modes for the materials. In a transportation system, placard rules that correlate placards, materials, and transportation or storage modes are pre-stored in a computer memory. Materials data is entered corresponding to a first predetermined material, as well as data corresponding to a predetermined transportation mode or a predetermined storage mode. One of the plurality of predetermined placards is selected in response to the materials data, the transportation or storage data, and the placard rules data. The transportable or storable material may be a hazardous material, and the placard rules therefore correspond to safety rules. In an apparatus aspect, an arrangement selects one of a plurality of placards. The arrangement has an input for facilitating entry of data corresponding to a first material, a classifications memory for storing classification data corresponding to a plurality of hazard classifications, an exceptions memory for storing exceptions data corresponding to a plurality of exceptions to the hazzard classifications, at least one of the exceptions being selected in response to the input arrangement, a general rules memory for storing general rules data corresponding to the plurality of placards; and a processor for selecting the determinable one of the plurality of placards in response to the input arrangement, the classifications memory, the exceptions memory, and the general rules memory.

67 Claims, 2 Drawing Sheets

SYSTEM FOR FACILITATING COMPLIANCE WITH MATERIALS HANDLING RULES

BACKGROUND OF THE INVENTION

1. Field of the Invention

This invention relates generally to systems and arrangements for selecting signage and placards, and more particularly, to a method and apparatus for storing data corresponding to rules and laws, inputting data corresponding to situation or condition, and selecting appropriate signage and/or placards.

2. Description of the Related Art

It is not uncommon for regulations and laws to impose obligations to post signs or placards. Quite often, the laws and regulations are complicated and require the signs or placards that are to be posted to be selected from a plurality of candidates in response to such laws. The trucking and shipping industry is an example of a regulated industry where vehicles, for example, are required to bear signage responsive to the materials being transported. The laws, however, are not limited to placard selection, but also control the condition of the transportation, such as environmental conditions (i.e., ventilation, humidity, heating, and cooling), weight limits, spatial relationships between materials transported within the same vehicle, and even whether certain materials can be transported at all by certain modes of transportation.

A similar situation exists in the warehousing industry. There is often a need in a storage facility to post signage that identifies the materials being stored. In addition, there is a need to identify prohibited conduct in the presence of certain transportable or storable materials, such prohibited conduct including, for example, limitations on smoking, carrying an open flame, failing to wear protective headgear or footwear, using radios or other sources of electromagnetic radiation, failing to wear radiation protection gear or monitors, subjecting material to shaking or impact shock, wetting materials, etc.

It is to be understood that not all limitations on signage or conduct in relation to transportable or storable materials are determined in response to laws and regulations. Signage requirements can additionally be established by policy decisions made by a manager, the transporter or warehouse management, or by agreement with the shipper.

It is, therefore, an object of this invention to provide a system for selecting placards in response to policy, agreement, regulation, or law.

It is another object of this invention to provide a system and arrangement for selecting one or more safety placards in a transportation or storage environment in response to the material being stored, its characteristics, and requirements derived from policy, agreement, regulation, or law.

It is also an object of this invention to provide a system for determining the transportability of a material, either singularly or in combination with another material.

It is a further object of this invention to provide a system for determining the adequacy of a vehicle to transport a predetermined material in a predetermined quantity. It is additionally an object of this invention to provide.

It is yet a further object of this invention to provide a system and arrangement for marking a container or package of a container with information that identifies its contents.

It is also another object of this invention to provide a system and arrangement for marking a vehicle with information that identifies its cargo.

It is yet an additional object of this invention to provide a system and arrangement for marking a bill of lading or other documents with information that identifies its referenced material(s) in accordance with determined rules.

SUMMARY OF THE INVENTION

The foregoing and other objects are achieved by this invention which provides, in accordance with a first system aspect of the invention, a system for determining a relationship between a plurality of transportable materials and a plurality of transportation modes for the transportable materials. The system, which is directed to the selection of appropriate placards for one or more materials that are to be transported, includes the steps of:

placard rules pre-storing in a computer memory placard rules data corresponding to a plurality of predetermined placards, each such placard corresponding to a selectable one of a characteristic of a transportable material and a predetermined relationship between a plurality of the transportable materials, and the plurality of transportation modes for the transportable materials;

first materials data inputting of first materials data corresponding to a first predetermined transportable material;

transportation data inputting of transportation data corresponding to a predetermined transportation mode; and placard selecting one of the plurality of predetermined placards in response to the first materials data, the transportation data, and the placard rules data.

The rules data correspond, in respective embodiments of this first system aspect of the invention, to a variety of types of rules that are applicable to the first material. These include, by way of example and without limitation:

safety rules that are applicable to the transportable material;

if the transportable material is hazardous, safety rules that are applicable to determine whether the hazardous material is transportable;

handling rules that are applicable to the manner by which the transportable material is to be handled;

perishability rules applicable to a perishability characteristic of the transportable material;

contractually derived rules applicable to the transportable material by agreement; and rules derived under law applicable to the transportable material by operation of law.

In a highly advantageous embodiment of the invention, there is further provided the step of second materials data inputting of second materials data corresponding to a second predetermined transportable material. Of course, the second material is subject to the variety of types of rules that are applicable to the first material. In this embodiment, however, prior to performing the step of second materials data inputting, there is further provided the step of segregation rules pre-storing in the computer memory segregation rules data corresponding to predetermined minimum spatial relationships between the plurality of materials and the plurality of transportation modes for the transportable materials. Thus, for example, materials that would react with each other during transportation are segregated. In this embodiment, therefore, there is further provided the step of segregation determining of a segregation requirement between the first and second transportable materials, in response to the first materials data, the second materials data, the transportation data, and the segregation rules data.

Also, even single materials that require isolation from personnel, such as radioactive materials, are accommodated within the scope of the invention.

The present invention includes within its scope transportable materials that have temperature sensitivity. Thus, there is further provided the step of temperature limitations pre-storing in the computer memory materials temperature limitations data corresponding to temperature limits to which the first predetermined transportable material can safely by subjected and to which the second predetermined transportable material can safely be subjected. There is therefore further provided the step of segregation determining of a temperature limitation segregation requirement between the first and second transportable materials. Thus, by way of example and without limitation, materials that cannot withstand freezing are segregated from materials that must be maintained frozen during transportation. The present invention therefore includes within its scope the further step of temperature limitations pre-storing in the computer memory materials temperature limitations data corresponding to temperature limits to which the first predetermined transportable material can safely be subjected.

In a still further embodiment of the invention, there is provided the step of first materials data inputting comprises the further step of quantity inputting of quantity data corresponding to a quantity of the first predetermined transportable material. In this embodiment, there is further provided the step of determining a transportability characteristic of the first transportable material in response to the quantity data.

In another embodiment of this first system aspect of the invention, prior to performing the step of placard selecting, there is further provided the step of materials characteristics pre-storing transportable material characteristics data responsive to at least one physical characteristic of the transportable material. The characteristics data corresponds to predetermined characteristics classifications of the transportable material that are selected, without limitation, from the following group of classifications including, but is not limited to:

a. non-transportable transportable materials class;
    b. transportable explosives class;
    c. transportable gases class;
    d. transportable inhalation hazards class;
    e. transportable flammable liquids class;
    f. transportable flammable solids class;
    g. transportable organic oxidizers class;
    h. transportable organic peroxides class;
    i. transportable poisons class;
    j. transportable radioactive hazards class;
    k. transportable combustible hazards class;
    l. transportable miscellaneous hazards class;
    m. transportable reactive hazards class;
    n. transportable infectious hazards class;
    o. transportable "dangerous when wet" class;
    p. transportable "do not shake" class;
    q. transportable perishable class;
    r. transportable corrosives class; and
    s. transportable non-hazards class.

Still another transportable material characteristic data corresponds to a magnetic flux density of the transportable material. Regulations impose magnetic flux limits on the transportability of certain transportable materials, and of course, such material may need to be segregated within the same vehicle from other materials that have magnetic sensitivity.

The regulations often are associated with specific transportation modes, and in such situations, the step of transportation data inputting comprises the step of inputting transport mode data corresponding to the transport mode, which may include, one or more of truck transport, rail transport, vessel transport, and aircraft transport. In a practicable embodiment of the invention, there is provided the step of inputting transport mode data corresponding to the dimensions of a transport vehicle, as well as environmental temperature control data, a heater arrangement of a transport vehicle, an air conditioning arrangement of a transport vehicle, limitations on solar exposure, and destination data corresponding to a destination of the first predetermined transportable material, which may include route data corresponding to a route via which the transportable material is to be transported. The destination data includes, in certain embodiments, data corresponding to obstacles and limitations that are expected to be encountered along the route. Such limitations are expected to be encountered along the route, and in some embodiments of the invention correspond to limitations applicable to a bridge or a tunnel on the route. In an international shipping embodiment, the destination data includes data corresponding to a country of destination of the first predetermined transportable material. Additionally, the destination data includes, in certain embodiments, data corresponding to controls imposed on exports by operation of law.

In accordance with a second system aspect of the invention, which is more specifically directed to safety signage of transport vehicles, there is provided a system for determining a selectable one of a plurality of predetermined safety placards that are to be installed on a transport vehicle in response to a selected one of a plurality of hazardous materials to be transported therein. The system includes the steps of:

placard rules pre-storing in a computer memory placard rules data corresponding to the plurality of predetermined safety placards, such placard rules data including regulatory data responsive to applicable rules and regulations, the placard rules data associated with respective ones of the predetermined safety placards containing hazardous material data associated therewith corresponding to a predetermined one of a plurality of hazard characteristic classifications of the associated hazardous material;

first materials data inputting of first materials data corresponding to a first hazardous material of the plurality of hazardous materials selected to be transported in the transport vehicle;

transportation data inputting of transportation data corresponding to a predetermined transportation mode; and placard selecting one of the plurality of predetermined safety placards in response to the first materials data, the transportation data, and the placard rules data.

In one embodiment of this second system aspect of the invention, in the step of placard rules pre-storing there is provided the further step of inputting data corresponding to a predetermined relationship between a plurality of the hazardous materials. Additionally, in a further embodiment, in the step of placard rules pre-storing there is provided the further step of inputting data corresponding to a segregation relationship that imposes spatial limitations between respective ones of the plurality of hazardous materials. A plurality of segregation relationships are provided, and there is provided the further step of selecting a strictest one of the plurality of segregation relationships.

In a further embodiment of this second system aspect of the invention, there is further provided the step of second materials data inputting of second materials data corresponding to a second hazardous material of the plurality of hazardous materials selected to be transported in the transport vehicle. Moreover, as is the case with the first system aspect of the invention, in the step of placard rules pre-storing there is provided the further step of inputting data corresponding to the plurality of transportation modes for the hazardous materials, the hazard characteristic classifications being selected from the group of classifications including, but not limited to:

a. non-transportable transportable materials class;
    b. transportable explosives class;
    c. transportable gases class;
    d. transportable inhalation hazards class;
    e. transportable flammable liquids class;
    f. transportable flammable solids class;
    g. transportable organic oxidizers class;
    h. transportable organic peroxides class;
    i. transportable poisons class;
    j. transportable radioactive hazards class;
    k. transportable combustible hazards class;
    l. transportable miscellaneous hazards class;
    m. transportable reactive hazards class;
    n. transportable infectious hazards class;
    o. transportable "dangerous when wet" class;
    p. transportable "do not shake" class;
    q. transportable perishable class;
    r. transportable corrosives class; and
    s. transportable non-hazards class.

In a further embodiment, the step of first materials data inputting includes the further step of inputting quantity data corresponding to an amount of the first hazardous material to be transported in the transport vehicle. Additionally, there is further provided the step of determining whether the first hazardous material to be transported in the transport vehicle is a limited quantity shipment, and the further step of determining whether the first hazardous material to be transported in the transport vehicle is a bulk shipment.

There is further provided the step of non-hazardous materials data inputting of non-hazardous materials data corresponding to non-hazardous materials selected to be transported in the transport vehicle. This includes, in certain embodiments, the further step of comestible materials data inputting of comestible materials data corresponding to comestible materials selected to be transported in the transport vehicle. It is understood, however, that not all comestible materials are non-hazardous. Such materials may be flammable, explosive, reactive, etc.

In accordance with a third system aspect of the invention, there is provided a system for determining a relationship between a plurality of storable materials and a plurality of storage modes for the storable materials, the system including, but not being limited to:

placard rules pre-storing in a computer memory placard rules data corresponding to a plurality of predetermined placards, each such placard corresponding to a selectable one of a characteristic of a storable material and a predetermined relationship between a plurality of the storable materials, and the plurality of storage modes for the storable materials;
    first materials data inputting of first materials data corresponding to a first predetermined storable material;
    storage data inputting of storage data corresponding to a predetermined storage mode; and
    placard selecting one of the plurality of predetermined placards in response to the first materials data, the storage data, and the placard rules data.

As previously noted, the rules data in certain embodiments of the invention corresponds to safety rules applicable to the storable material. The first predetermined storable material is a hazardous material and the rules data corresponds to safety rules applicable to storable hazardous material. In embodiments where the first predetermined storable material is a hazardous material, the rules data corresponds to safety rules applicable to determine whether the hazardous material is storable and the manner by which the storable material is to be handled.

Additionally, the rules data corresponds in other embodiments to perishability rules that are applicable to a perishability characteristic of the storable material.

Also as previously noted, the rules data corresponds in some embodiments of the invention to contractually derived rules applicable to the storable material by agreement. In other embodiments, the rules data corresponds to rules derived under law applicable to the storable material by operation of law.

Other embodiments of this aspect of the invention provide the further step of second materials data inputting of second materials data corresponding to a second predetermined storable material, as previously described, including the step of segregation rules pre-storing in the computer memory to establish predetermined minimum spatial relationships between the plurality of materials and the plurality of storage modes for the storable materials. Also as previously noted, there is provided the further step of temperature limitations pre-storing in the computer memory materials temperature limitations data corresponding to temperature limits to which the first predetermined storable material can safely by subjected and to which the second predetermined storable material can safely by subjected.

In accordance with an apparatus aspect of the invention, there is provided an arrangement for selecting a determinable one of a plurality of placards. The arrangement includes an input arrangement for facilitating entry of first material data corresponding to a first material. A classifications memory stores classification data corresponding to a plurality of hazzard classifications. An exceptions memory is used to store exceptions data corresponding to a plurality of exceptions to the hazzard classifications, at least one of the exceptions being selected in response to the input arrangement. There is further provided a general rules memory for storing general rules data corresponding to the plurality of placards. A processor selects the determinable one of the plurality of placards in response to the input arrangement, the classifications memory, the exceptions memory, and the general rules memory.

In accordance with one embodiment of this apparatus aspect of the invention, the classification data contains data corresponding to classifications that are selected from the group of classifications that includes, but is not limited to:

a. non-transportable transportable materials class;
    b. transportable explosives class;
    c. transportable gases class;
    d. transportable inhalation hazards class;
    e. transportable flammable liquids class;
    f. transportable flammable solids class;
    g. transportable organic oxidizers class;
    h. transportable organic peroxides class;
    i. transportable poisons class;
    j. transportable radioactive hazards class;

k. transportable combustible hazards class;
l. transportable miscellaneous hazards class;
m. transportable reactive hazards class;
n. transportable infectious hazards class;
o. transportable "dangerous when wet" class;
p. transportable "do not shake" class;
q. transportable perishable class;
r. transportable corrosives class; and
s. transportable non-hazards class.

In an embodiment of the invention that is directed to a warehousing, or storage, environment, the classification data contains data corresponding to classifications that are selected from the group of classifications includes, but is not limited to:
a. non-storable storable materials class;
b. storable explosives class;
c. storable gases class;
d. storable inhalation hazards class;
e. storable flammable liquids class;
f. storable flammable solids class;
g. storable organic oxidizers class;
h. storable organic peroxides class;
i. storable poisons class;
j. storable radioactive hazards class;
k. storable combustible hazards class;
l. storable miscellaneous hazards class;
m. storable reactive hazards class;
n. storable infectious hazards class;
o. storable "dangerous when wet" class;
p. storable "do not shake" class;
q. transportable perishable class;
r. transportable corrosives class; and
s. transportable non-hazards class.

In one embodiment of this apparatus aspect of this invention, the input arrangement facilitates entry of temperature data corresponding to a temperature characteristic of the first material, the temperature data corresponding to a temperature characteristic of the first material. Additionally, the input arrangement facilitates entry of weight data corresponding to a weight characteristic of the first material. The processor is arranged to convert the weight data between first and second weight systems.

As previously noted with respect to the system aspects of the invention, the input arrangement facilitates entry of second material data corresponding to a second material. Also, there is further provided a segregation memory for storing segregation data corresponding to a predetermined minimum spatial relationship between the first and second materials.

BRIEF DESCRIPTION OF THE DRAWING

Comprehension of the invention is facilitated by reading the following detailed description, in conjunction with the annexed drawing, in which.

DETAILED DESCRIPTION

Figure 1:
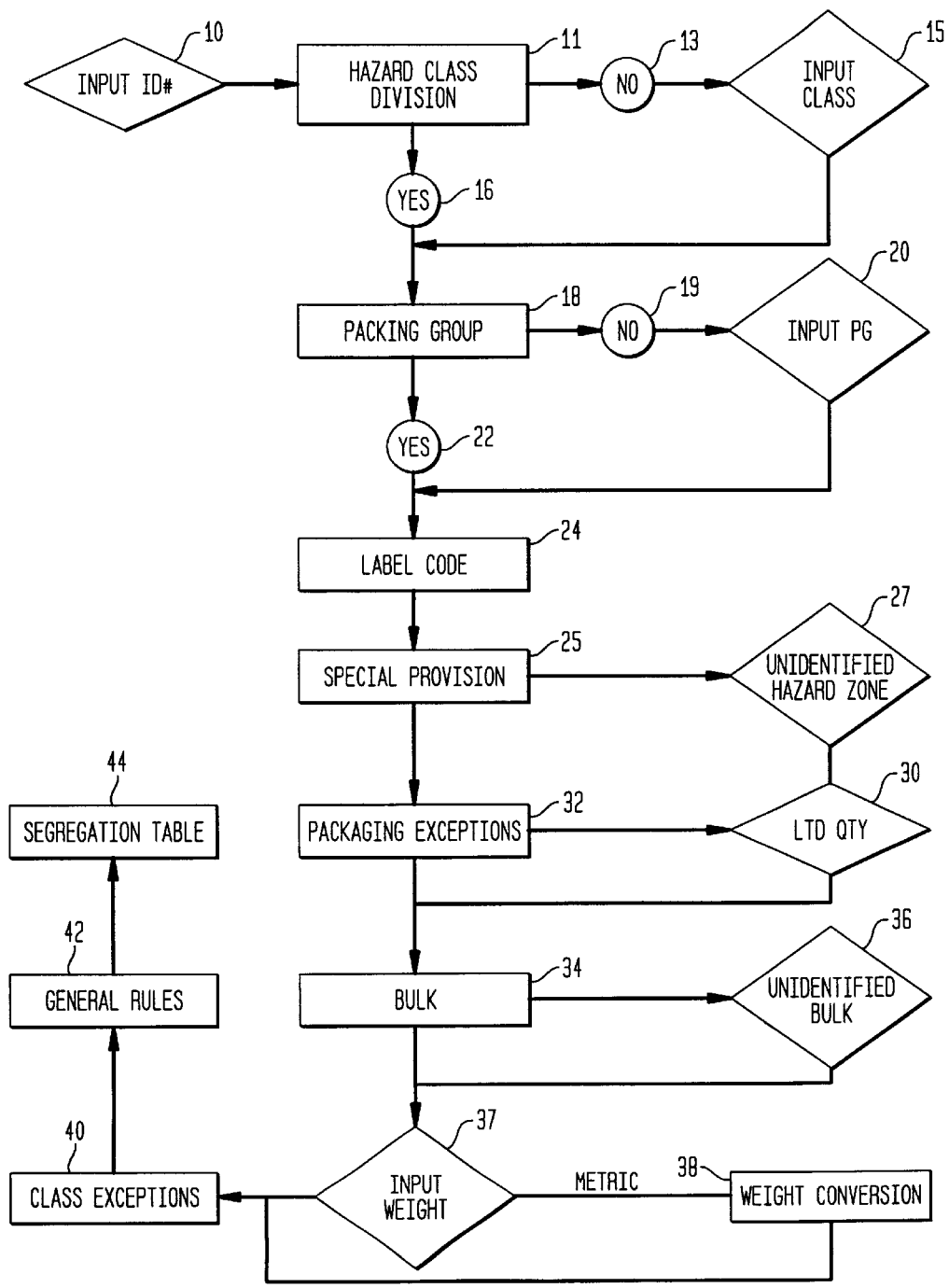
FIG. 1 is a flow diagram that describes an overall process system of a transportable hazardous materials embodiment of the invention.
Figure 2:
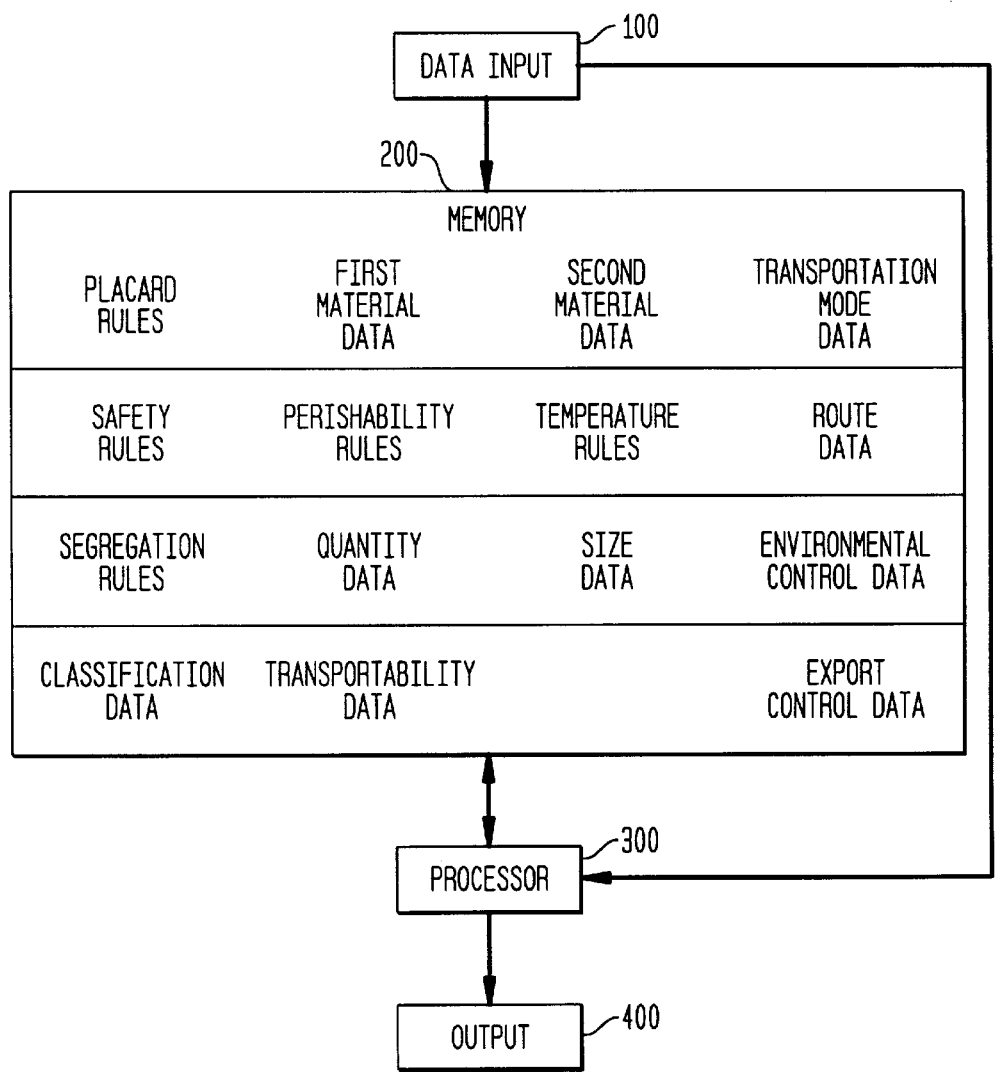
FIG. 2 is a schematic and function block representation that illustrates a simplified arrangement configured in accordance with the invention.

FIG. 1 is a flow diagram that illustrates a process that conforms to a transportable hazardous materials embodiment of the present invention. As shown in this figure, data, including the user's identification information, is entered at function block 10. The information, which includes a variety of types of data that will be discussed in greater detail hereinbelow in connection with FIG. 2, is conducted to block 11, which selects the hazard class division from a plurality of pre-stored classes. If the class is not found, a negative determination at block 13 causes a prompt to be generated for the operator to enter the appropriate class at block 15. The process then continues to the selection of a packing group at function block 18, as would have been the case if a positive indication of presence of the class had been present at a block 16.

The packing group is first sought to be selected from the packing group information in block 18. If an appropriate packing group is not found, the negative response at block 19 prompts entry of that information at function block 20, whereupon a label code is generated at function block 24 as though a positive indication had been received at function block 22.

Accommodation for a special provision is obtained at function block 25. Such special provision may relate, for example, to whether the material is in liquid form or in solid form, or may relate to a specific material, such as uranium hexafluoride. A positive response as to whether there is present an unidentified hazard zone is determined at function block 27. The information entered at this point is beneficial, for example, to emergency response personnel who readily can associate indications of zone A, zone B, zone C, zone D, and the like, with the need for particular gear or protective equipment in the event of an accident.

Quantity characteristics are then examined beginning at function block 30, denominated "limited quantity." Packaging exceptions are defined at block 32, and may include, for example, data relating to the size of a container or package.

At block 34, it is determined whether the material that has been entered is a bulk material. At block 36, data corresponding to bulk material that is not identified at block 34 is requested, and the operator then will enter manually the unidentified bulk material. Upon the identity of the bulk material having bees established, the process continues to block 37 where the weight of the material is entered. If the weight is entered in metric units, a conversion is effected at block 38.

At this point in the process, the data is analyzed at function block 40 to determine whether an exception has been created. The resulting hazard class and exceptions thereto are analyzed in the context of the applicable general rules at block 42, and the need for materials segregation, if any, is determined at block 44 from predetermined segregation requirements stored in memory in tabular form.

FIG. 2 is a schematic and function block representation that illustrates a simplified arrangement configured in accordance with a specific illustrative embodiment of the invention. As shown in this figure, data is entered into the arrangement at a dat input 100. The entered data is then processed by a processor 300 in accordance with rules and other data that is stored in a memory 200. The results of the analysis are then presented to the user at an output device 400, which may be a display or monitor.

In this figure, memory 200 is schematically represented as a unitary block. However, the memory arrangement of practicable embodiments of the invention are not necessarily a singular unit, but instead may formed of plural memory elements, such as ROMs, RAMs, hard drive disks, removable media, machine readable media, etc. The rules and data that can be stored in the various implementations of this specific illustrative embodiment of the invention include, for example:

1. placard rules that set forth the conditions under which a sign or placard is to be selected, and may include laws, rules, and regulations applicable to particular materials;
2. first materials data that includes the identification and characteristics of a material to be transported or stored;
3. second materials data that includes the identification and characteristics of a further material to be transported or stored;
4. safety rules, which may include OSHA and other laws, rules, and regulations applicable to modes of transportation or storage, and to certain materials;
5. perishability rules that govern the procedures to be used during transportation or storage of certain perishable materials;
6. environmental temperature rules that govern the use of heaters, refrigerators, freezers, and air conditioning equipment;
7. route data that, in addition to map-like information can also include destination information, export restrictions imposed by operation of law, impediments and limitations that can be expected en route, and other route and destination related information;
8. segregation rules that govern spatial relationships that are to be maintained between transported or stored items or materials;
9. quantity data that identifies the weight or mass of the transported or stored items or materials;
10. size data that identifies the dimensions of the transported or stored items or materials;
11. environmental control data that sets forth specification and limitations of environmental control equipment, such as prohibitions on heaters that contain open flames;
12. classification data that includes, for example:
    a. non-transportable transportable materials class;
    b. transportable explosives class;
    c. transportable gases class;
    d. transportable inhalation hazards class;
    e. transportable flammable liquids class;
    f. transportable flammable solids class;
    g. transportable organic oxidizers class;
    h. transportable organic peroxides class;
    i. transportable poisons class;
    j. transportable radioactive hazards class;
    k. transportable combustible hazards class;
    l. transportable miscellaneous hazards class;
    m. transportable reactive hazards class;
    n. transportable infectious hazards class;
    o. transportable "dangerous when wet" class;
    p. transportable "do not shake" class;
    q. transportable perishable class;
    r. transportable corrosives class; and
    s. transportable non-hazards class; and
13. transportability or storability data that sets forth whether and how specific items or materials intended to be transported or stored are to be treated, and whether they can be transported or stored at all.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for determining a relationship between a plurality of transportable materials and a plurality of transportation modes for the transportable materials, the system comprising:
    placard rules pre-storing in a computer memory placard rules data corresponding to a plurality of predetermined placards, each such placard corresponding to a selectable one of a characteristic of a transportable material and a predetermined relationship between a plurality of the transportable materials, and the plurality of transportation modes for the transportable materials;
    first materials data inputting of first materials data corresponding to a first predetermined transportable material;
    transportation data inputting of transportation data corresponding to a predetermined transportation mode; and
    placard selecting one of the plurality of predetermined placards in response to the first materials data, the transportation data, and the placard rules data.

2. The system of claim 1, wherein the rules data corresponds to safety rules applicable to the transportable material.

3. The system of claim 2, wherein the first predetermined transportable material is a hazardous material and the rules data corresponds to safety rules applicable to transportable hazardous material.

4. The system of claim 2, wherein the first predetermined transportable material is a hazardous material and the rules data corresponds to safety rules applicable to determine whether the hazardous material is transportable.

5. The system of claim 1, wherein the rules data corresponds to handling rules applicable to the manner by which the transportable material is to be handled.

6. The system of claim 1, wherein the rules data corresponds to perishability rules applicable to a perishability characteristic of the transportable material.

7. The system of claim 1, wherein the rules data corresponds to contractually derived rules applicable to the transportable material by agreement.

8. The system of claim 1, wherein the rules data corresponds to rules derived under law applicable to the transportable material by operation of law.

9. The system of claim 1, wherein there is further provided the step of second materials data inputting of second materials data corresponding to a second predetermined transportable material.

10. The system of claim 9, wherein, prior to performing said step of second materials data inputting, there is further provided the step of segregation rules pre-storing in the computer memory segregation rules data corresponding to predetermined minimum spatial relationships between the plurality of materials and the plurality of transportation modes for the transportable materials.

11. The system of claim 10, wherein there is further provided the step of segregation determining of a segregation requirement between the first and second transportable materials, in response to the first materials data, the second materials data, the transportation data, and the segregation rules data.

12. The system of claim 9, wherein there is further provided the step of temperature limitations pre-storing in the computer memory materials temperature limitations data corresponding to temperature limits to which the first predetermined transportable material can safely be subjected and to which the second predetermined transportable material can safely be subjected.

13. The system of claim 12, wherein there is further provided the step of segregation determining of a temperature limitation segregation requirement between the first and second transportable materials.

14. The system of claim 1, wherein there is further provided the step of temperature limitations pre-storing in the computer memory materials temperature limitations data corresponding to temperature limits to which the first predetermined transportable material can safely be subjected.

15. The system of claim 1, wherein said step of first materials data inputting comprises the further step of quantity inputting of quantity data corresponding to a quantity of the first predetermined transportable material.

16. The system of claim 15, wherein there is further provided the step of determining a transportability characteristic of the first transportable material in response to the quantity data.

17. The system of claim 1, wherein, prior to performing said step of placard selecting, there is further provided the step of materials characteristics pre-storing transportable material characteristics data responsive to at least one physical characteristic of the transportable material.

18. The system of claim 17, wherein the characteristics data corresponds to a predetermined characteristics classifications of the transportable material.

19. The system of claim 18, wherein the predetermined characteristics classifications are selected from the group of classifications comprising:

a. non-transportable transportable materials class;
b. transportable explosives class;
c. transportable gases class;
d. transportable inhalation hazards class;
e. transportable flammable liquids class;
f. transportable flammable solids class;
g. transportable organic oxidizers class;
h. transportable organic peroxides class;
i. transportable poisons class;
j. transportable radioactive hazards class;
k. transportable combustible hazards class;
l. transportable miscellaneous hazards class;
m. transportable reactive hazards class;
n. transportable infectious hazards class;
o. transportable "dangerous when wet" class;
p. transportable "do not shake" class;
q. transportable perishable class;
r. transportable corrosives class; and
s. transportable non-hazards class.

20. The system of claim 17, wherein the transportable material characteristics data corresponds to a magnetic flux density related to the transportable material.

21. The arrangement of claim 18, wherein the predetermined characteristics classifications are established pursuant to regulation under law of the transportation mode.

22. The system of claim 1, wherein said step of transportation data inputting comprises the step of inputting transport mode data corresponding to a transport mode.

23. The system of claim 22, wherein the transport mode is selected from the group of transportation modes comprising:

a. truck transport;
b. rail transport;
c. vessel transport; and
d. aircraft transport.

24. The system of claim 22, wherein said step of transportation data inputting comprises the step of inputting transport mode data corresponding to the dimensions of a transport vehicle.

25. The system of claim 22, wherein said step of transportation data inputting comprises the step of inputting environmental temperature control data.

26. The system of claim 25, wherein said step of transportation data inputting comprises the step of inputting transport mode data corresponding to a heater arrangement of a transport vehicle.

27. The system of claim 25, wherein said step of transportation data inputting comprises the step of inputting transport mode data corresponding to an air conditioning arrangement of a transport vehicle.

28. The system of claim 25, wherein said step of transportation data inputting comprises the step of inputting transport mode data corresponding to limitations on solar exposure.

29. The system of claim 1, wherein there is further provided the step of destination data inputting of destination data corresponding to a destination of the first predetermined transportable material.

30. The system of claim 29, wherein the destination data includes data corresponding to a route via which the transportable material is to be transported.

31. The system of claim 30, wherein the destination data includes data corresponding to obstacles that are expected to be encountered along the route.

32. The system of claim 30, wherein the destination data includes data corresponding to limitations that are expected to be encountered along the route.

33. The system of claim 32, wherein the limitations that are expected to be encountered along the route correspond limitations applicable to a bridge on the route.

34. The system of claim 32, wherein the limitations that are expected to be encountered along the route correspond limitations applicable to a tunnel on the route.

35. The system of claim 29, wherein the destination data includes data corresponding to a country of destination of the first predetermined transportable material.

36. The system of claim 35, wherein the destination data includes data corresponding to controls imposed on exports by operation of law.

37. A system for determining a selectable one of a plurality of predetermined safety placards to be installed on a transport vehicle in response to a selected one of a plurality of hazardous materials to be transported therein, the system comprising:

placard rules pre-storing in a computer memory placard rules data corresponding to the plurality of predetermined safety placards, such placard rules data including regulatory data responsive to applicable rules and regulations, the placard rules data associated with respective ones of the predetermined safety placards containing hazardous material data associated therewith corresponding to a predetermined one of a plurality of hazard characteristic classifications of the associated hazardous material;

first materials data inputting of first materials data corresponding to a first hazardous material of said plurality of hazardous materials selected to be transported in the transport vehicle;

transportation data inputting of transportation data corresponding to a predetermined transportation mode; and placard selecting one of the plurality of predetermined safety placards in response to the first materials data, the transportation data, and the placard rules data.

38. The system of claim 37, wherein in said step of placard rules pre-storing there is provided the further step of inputting data corresponding to a predetermined relationship between a plurality of the hazardous materials.

39. The system of claim 38, wherein in said step of placard rules pre-storing there is provided the further step of inputting data corresponding to a segregation relationship that imposes spatial limitations between respective ones of the plurality of hazardous materials.

40. The system of claim 39, wherein there are provided a plurality of segregation relationships, and there is provided the further step of selecting a strictest one of the plurality of segregation relationships.

41. The system of claim 39, wherein there is further provided the step of second materials data inputting of second materials data corresponding to a second hazardous material of said plurality of hazardous materials selected to be transported in the transport vehicle.

42. The system of claim 37, wherein in said step of placard rules pre-storing there is provided the further step of inputting data corresponding to the plurality of transportation modes for the hazardous materials.

43. The system of claim 37, wherein the hazard characteristic classifications are selected from the group of classifications comprising:

a. non-transportable transportable materials class;
b. transportable explosives class;
c. transportable gases class;
d. transportable inhalation hazards class;
e. transportable flammable liquids class;
f. transportable flammable solids class;
g. transportable organic oxidizers class;
h. transportable organic peroxides class;
i. transportable poisons class;
j. transportable radioactive hazards class;
k. transportable combustible hazards class;
l. transportable miscellaneous hazards class;
m. transportable reactive hazards class;
n. transportable infectious hazards class;
o. transportable "dangerous when wet" class;
p. transportable "do not shake" class;
q. transportable perishable class;
r. transportable corrosives class; and
s. transportable non-hazards class.

44. The system of claim 37, wherein said step of first materials data inputting include the further step of inputting quantity data corresponding to an amount of the first hazardous material to be transported in the transport vehicle.

45. The system of claim 44, wherein there is further provided the step of determining whether the first hazardous material to be transported in the transport vehicle is a limited quantity shipment.

46. The system of claim 44, wherein there is further provided the step of determining whether the first hazardous material to be transported in the transport vehicle is a bulk shipment.

47. The system of claim 37, wherein there is further provided the step of non-hazardous materials data inputting of non-hazardous materials data corresponding to non-hazardous materials selected to be transported in the transport vehicle.

48. The system of claim 47, wherein there is further provided the step of comestible materials data inputting of comestible materials data corresponding to comestible materials selected to be transported in the transport vehicle.

49. A system for determining a relationship between a plurality of storable materials and a plurality of storage modes for the storable materials, the system comprising:

placard rules pre-storing in a computer memory placard rules data corresponding to a plurality of predetermined placards, each such placard corresponding to a selectable one of a characteristic of a storable material and a predetermined relationship between a plurality of the storable materials, and the plurality of storage modes for the storable materials;

first materials data inputting of first materials data corresponding to a first predetermined storable material;

storage data inputting of storage data corresponding to a predetermined storage mode; and placard selecting one of the plurality of predetermined placards in response to the first materials data, the storage data, and the placard rules data.

50. The system of claim 49, wherein the rules data corresponds to safety rules applicable to the storable material.

51. The system of claim 50, wherein the first predetermined storable material is a hazardous material and the rules data corresponds to safety rules applicable to storable hazardous material.

52. The system of claim 50, wherein the first predetermined storable material is a hazardous material and the rules data corresponds to safety rules applicable to determine whether the hazardous material is storable.

53. The system of claim 49, wherein the rules data corresponds to handling rules applicable to the manner by which the storable material is to be handled.

54. The system of claim 49, wherein the rules data corresponds to perishability rules applicable to a perishability characteristic of the storable material.

55. The system of claim 49, wherein the rules data corresponds to contractually derived rules applicable to the storable material by agreement.

56. The system of claim 49, wherein the rules data corresponds to rules derived under law applicable to the storable material by operation of law.

57. The system of claim 49, wherein there is further provided the step of second materials data inputting of second materials data corresponding to a second predetermined storable material.

58. The system of claim 57, wherein, prior to performing said step of second materials data inputting, there is further provided the step of segregation rules pre-storing in the computer memory segregation rules data corresponding to predetermined minimum spatial relationships between the plurality of materials and the plurality of storage modes for the storable materials.

59. The system of claim 58, wherein there is further provided the step of segregation determining of a segregation requirement between the first and second storable materials, in response to the first materials data, the second materials data, the storage data, and the segregation rules data.

60. The system of claim 58, wherein there is further provided the step of temperature limitations pre-storing in the computer memory materials temperature limitations data corresponding to temperature limits to which the first predetermined storable material can safely be subjected and to which the second predetermined storable material can safely be subjected.

61. The system of claim 60, wherein there is further provided the step of segregation determining of a temperature limitation segregation requirement between the first and second storable materials.

62. The system of claim 49, wherein there is further provided the step of temperature limitations pre-storing in the computer memory materials temperature limitations data corresponding to temperature limits to which the first predetermined storable material can safely be subjected.

63. The system of claim 49, wherein, prior to performing said step of placard selecting, there is further provided the step of materials characteristics pre-storing storable material characteristics data responsive to at least one physical characteristic of the storable material.

64. The system of claim 63, wherein the characteristics data corresponds to a predetermined characteristics classifications of the storable material.

65. The system of claim 64, wherein the predetermined characteristics classifications are selected from the group of classifications comprising:

a. non-storable storable materials class;

b. storable explosives class;

c. storable gases class;

d. storable inhalation hazards class;

e. storable flammable liquids class;

f. storable flammable solids class;

g. storable organic oxidizers class;

h. storable organic peroxides class;

i. storable poisons class, j. storable radioactive hazards class;

k. storable combustible hazards class;

l. storable miscellaneous hazards class;

m. storable reactive hazards class;

n. storable infectious hazards class;

o. storable "dangerous when wet" class;

p. storable "do not shake" class;

q. transportable perishable class;

r. transportable corrosives class; and s. transportable non-hazards class.

66. The system of claim 64, wherein the storable material characteristics data corresponds to a magnetic flux density related to the storable material.

67. The arrangement of claim 66, wherein the predetermined characteristics classifications are established pursuant to regulation under law of the storage mode.

* * * * *